US008149693B2

(12) United States Patent
Zhou et al.

(10) Patent No.: US 8,149,693 B2
(45) Date of Patent: Apr. 3, 2012

(54) METHOD OF IMPLEMENTING ASSOCIATION IN AUTOMATIC SWITCHED OPTICAL NETWORK (ASON)

(75) Inventors: Yang Zhou, Shenzhen (CN); Yong Chen, Shenzhen (CN); Junzhou Cai, Shenzhen (CN); Liang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 11/598,363

(22) Filed: Nov. 13, 2006

(65) Prior Publication Data

US 2007/0121635 A1    May 31, 2007

(51) Int. Cl.
*G01R 31/08* (2006.01)
*H04L 12/28* (2006.01)

(52) U.S. Cl. .................. 370/223; 370/225; 370/392

(58) Field of Classification Search .................. None
See application file for complete search history.

(56) References Cited

U.S. PATENT DOCUMENTS

| 7,095,712 | B2 * | 8/2006 | Kinoshita et al. | 370/217 |
|---|---|---|---|---|
| 2003/0016654 | A1 * | 1/2003 | Das et al. | 370/351 |
| 2003/0084367 | A1 | 5/2003 | Suemura | |
| 2003/0233474 | A1 | 12/2003 | Yamamoto | |
| 2004/0052207 | A1 | 3/2004 | Charny et al. | |
| 2004/0218923 | A1 * | 11/2004 | Ozugur et al. | 398/57 |
| 2004/0252635 | A1 * | 12/2004 | Kasper | 370/216 |
| 2005/0050171 | A1 * | 3/2005 | Deerman et al. | 709/219 |

FOREIGN PATENT DOCUMENTS

| CN | 1492603 | 4/2004 |
|---|---|---|
| CN | 1496629 | 4/2004 |
| CN | 1496629 A | 5/2004 |
| EP | 1395003 | 3/2004 |
| WO | WO 2005-122442 | 12/2005 |

OTHER PUBLICATIONS

J.P.Lang, et al CCAMP GMPLS P&R Design Team J P Lang (Editor) Y Rekhter (Editor) D Papadimitriou (Editor); "RSVP-TE Extensions in support of End-to-End Generalized Multi-Protocol Label Switching (GMPLS)-based Recovery; draft-ietf-ccamp-gmpls-recovery-e23-signaling-02.txt" IETF Standard-Working-Draft, Internet Engineering Task Force, IETF, CH, vol. Ccamp, No. 2, Oct. 1, 2004, XP015038128, ISSN: 0000-0004.

Peng Wan, et al; "Achieving End-to-End Diversity over ASON Architecture", Communications, 2006 Asia-Pacific Conference on, IEEE, PI, Aug. 1, 2006, pp. 101-105, XP031024254, ISBN: 978-1-4244-0573-2.

European Fourth Office Action, date Dec. 23, 2010; Appln. No. 05 752 256.7.

WIPO International Preliminary Report.
Chinese Grant Document.

(Continued)

*Primary Examiner* — John Blanton
(74) *Attorney, Agent, or Firm* — Conley Rose, P.C.; Grant Rodolph (57) ABSTRACT

A method of implementing association in an Automatic Switched Optical Network. When an initial node of the 1+1 protection service is outside the ASON, it associates the primary service and the slave service to realize 1+1 protection. This invention includes: a node of a first associated service acquiring path information of a second associated service from a node of the second associated service, and associating the second associated service to the first associated service according to the path information of the second associated service.

13 Claims, 6 Drawing Sheets

OTHER PUBLICATIONS

First Chinese Office Action.
First European Office Action.
Second European Office Action.

Foreign Communication From a Related Counterpart Application, European Application 05752256.7, Office Action dated Jun. 24, 2011, 5 pages.

* cited by examiner

METHOD OF IMPLEMENTING ASSOCIATION IN AUTOMATIC SWITCHED OPTICAL NETWORK (ASON)

FIELD OF THE INVENTION

The present invention relates to telecommunication techniques, and more particularly, to a method of implementing association in an Automatic Switched Optical Network (ASON).

BACKGROUND OF THE INVENTION

With rapid development of the Internet and Optical Fiber Technologies, the integration of Internet Protocol (IP) technology and Optical Network technology would be a considerable tendency of the network development in the future. The Generalized Multi-Protocol Label Switching (GMPLS) technology, which inherits almost all the properties and protocols of Multi-Protocol Label Switching (MPLS) technology, provides a beneficial way to integrate the IP layer and the Optical layer. Being an extending application of MPLS in the Optical Network, the GMPLS could manage networks constructed through different technologies using a unified control plane, and provide an important guarantee for simplifying network structure, reducing network administration cost and optimizing network performance. To meet the future requirements of dynamically providing network resources and transmitting signalings in an ASON, it is necessary to extend and update the traditional MPLS technology. The GMPLS is an extension of MPLS towards the optical network, which not only supports traditional switches, such as packet switch, time division switch, wavelength switch and optical switch, but also modifies and extends original routing and signaling protocols. To support circuit switch and optical switch, the GMPLS employs a special label to identify parameters such as optical fiber, waveband, wavelength and time-slot etc., the length and format of the special label varies with different application environments. For instance, in a wavelength label switching application, the port/wavelength label is of 32 bits, representing the optical fiber or port or wavelength being used. The port/wavelength label does not have fields such as an experimental bit, bottom of the label stack, etc., which is different to a traditional label, while it has local validity only among neighbor nodes which is the same as a traditional label. The value of the label could be manually assigned or dynamically decided by a protocol, thus the label format of GMPLS leaves a lot of space for supporting more intelligent services.

In the prior art, service establishment of ASON is controlled by signalings of GMPLS. The GMPLS protocol suite includes: link management protocol which is used for finding out neighbor nodes; extended Open Shortest Path First (OSPF) protocol and Intermediate System Routing protocol which are used for link state distribution; Constraint-Based Routing Label Distribution Protocol (CR-LDP) and Resource Reservation Protocol-Traffic Engineering (RSVP-TE) which are used for managing and controlling channels. Both the RSVP-TE and the CR-LDP could bear all the objects defined in the GMPLS system, thus the establishing, modifying, inquiring and deleting of Label Switching Path (LSP) are completed by the CR-LDP or the RSVP-TE. Once an LSP is established, the ASON is able to transmit various services over the LSP at a high speed.

The ASON provides 1+1 protection to better protect the transmitted services. The 1+1 protection mechanism is using two different paths (e.g. LSPs) to transmit the primary service and the slave service of a certain service respectively, wherein the primary service and the slave service are completely the same. A detector is configured at the receiving end to select better service data from the two paths. In the following, a service requiring 1+1 protection is called a 1+1 protection service, which includes a primary service and a slave service. For the 1+1 protection service, each path has rerouting ability, that is, if either of the two paths fails, the path could recover from the failure through rerouting.

The GMPLS completes service transmission in the ASON through establishing LSPs. As far as a 1+1 protection service is concerned, LSP IDs generated according to the initial node for indentifying LSPs and identifiers of both the primary service and the slave service could make the two paths of the primary service and the slave service exclusive with each other at the initial manual configuration. The exclusion of paths means there are no other common nodes and/or links in these two paths except for the initial node and/or terminal node.

The process of establishing LSPs for a 1+1 protection service is introduced in the following with reference to FIG. 1.

Figure 1:
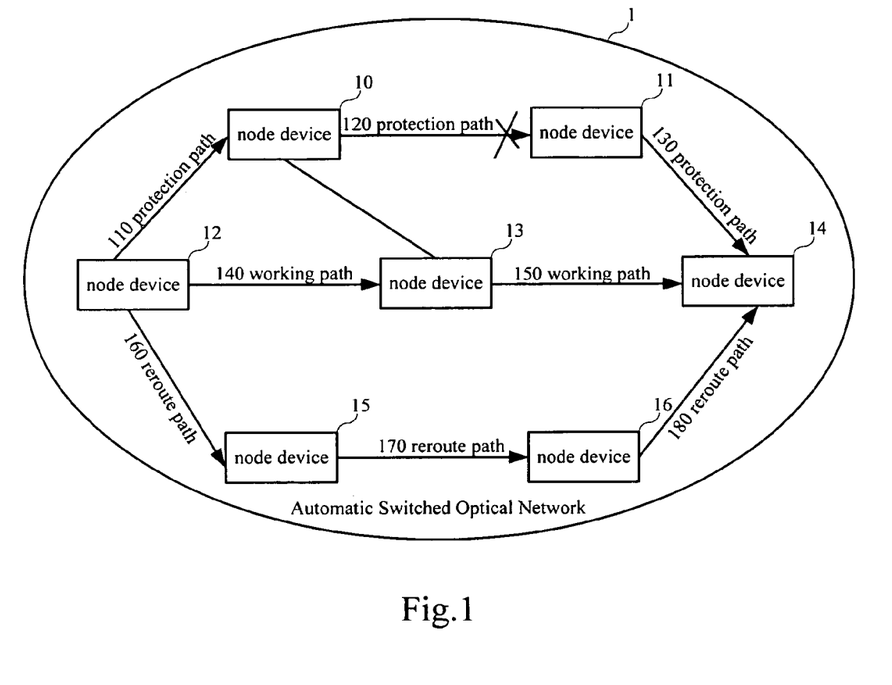
FIG. 1 is a schematic diagram illustrating principles of 1+1 protection mechanism in an ASON of the related art.

As shown in FIG. 1, the ASON 1 represents an optical transport network, including node device 10, node device 11, node device 12, node device 13, node device 14, node device 15 and node device 16, with the connection relations configured in advance among these node devices. It should be pointed out that, in FIG. 1, the initial node of the 1+1 protection service is node device 12, and the terminal node is node device 14. Since both of the two nodes are inside the ASON 1, node device 12 is also the entrance node of the ASON 1, and node device 14 is the exit node of the ASON 1.

In the process, a link between node devices 12 and 10 is first established at Step 110, and a link between node devices 10 and 11 is established at Step 120. Then, a link between node devices 11 and 14 is established at Step 130. After that, an LSP including the links established at Steps 110, 120 and 130 in the ASON 1 is formed to be a protection path for transmitting the slave service of the 1+1 protection service.

At Step 140, a link between node devices 12 and 13 is established, and at Step 150, a link between node devices 13 and 14 is established. After that, an LSP including the links established at Steps 140 and 150 in the ASON 1 is formed to be a working path for transmitting the primary service of the 1+1 protection service.

When the protection path established at Steps 110, 120 and 130 works well, the protection path performs 1+1 protect for the working path established at Steps 140 and 150. In FIG. 1, after a certain 1+1 protection service transmitted through the ASON 1 arrives at node device 12, service data of the 1+1 protection service is not only transmitted through the working path established at Steps 140 and 150, which means the service data can arrive at node device 14 through node devices 12 and 13, but also copied by node device 12 to the protection path established at Steps 110, 120 and 130 for transmission, which means the same service data can arrive at node device 14 through node devices 12, 10 and 11. Then, the detector on node device 14 may choose better service data from these two LSPs. Normally, the service data transmitted through node devices 12 and 13 will be selected. It can be seen that the above process enhances the reliability of service data transmission.

Moreover, in the 1+1 protection service, it is specified that the working path and the protection path do not have any other intersection except for the entrance node and the exit node, that is, no other nodes and/or links of these two paths are the same. Therefore, although there is a physical channel between node devices 10 and 13, they could not be included together in any LSP.

The situation when the protection path established at Steps 110, 120 and 130 goes wrong will be depicted hereinafter.

As shown in FIG. 1, assuming the link established at Step 120 is broken, the protection path established through Steps 110, 120 and 130 could not work any more. In this case, if 1+1 protection is still desired by the services passing through the ASON 1, a new protection path should immediately be found and established within the ASON 1. That is to say, node device 12 may conduct rerouting after receiving a failure notice from node device 10, and calculate a new protection path according to network topology information of the ASON 1.

Then, a link between node devices 12 and 15 is established at Step 160, and a link between node devices 15 and 16 is established in succession at Step 170, finally a link between node devices 16 and 14 is established at Step 180.

After that, the new protection path is set up between node devices 12, 15, 16 and 14 to replace the old one established through Steps 110, 120 and 130, and provides 1+1 protection for the working path established through Steps 140 and 150.

Moreover, according to the specification of 1+1 protection mechanism, no other intersection is allowed between the working path and the protection path except for the entrance node and/or exit node. Thus, how to guarantee the exclusion between the working path and the new protection path has become a problem.

In addition, when the initial node and/or terminal node of the 1+1 protection service are/is outside the ASON, no corresponding solution is available yet to guarantee the exclusion between the working path and the protection path. The reason lies in that inside the ASON, there is no common entrance node and/or exit node for these two LSPs transmitting the 1+1 protection service, thus the exclusion of LSPs could not be guaranteed according to the ordinary 1+1 protection mechanism. With regard to this problem, no solution has yet been given in standards and drafts of Internet Engineering Task Force (IETF), International Telecommunication Union (ITU) or Optical Interworking Forum (OIF). In other words, when the initial node and/or terminal node of the 1+1 protection service are/is outside the ASON, there is no mature solution in the industry on implementing 1+1 protection for services in the ASON.

SUMMARY

This invention is to provide a method of implementing association in an ASON, which can provide better 1+1 protection through establishing an association relation between the primary service and the slave service when the initial node and/or terminal node of the 1+1 protection service are/is outside the ASON.

A method of implementing association in an Automatic Switched Optical Network (ASON), the method including: a node of a first associated service acquiring path information of a second associated service from a node of the second associated service, and associating the second associated service to the first associated service according to the path information of the second associated service.

A method of implementing association in an Automatic Switched Optical Network (ASON), the method including: setting a first associated service and a second associated service as the primary service and slave service of a 1+1 protection service;

a node of the first associated service acquiring path information of the second associated service from a node of the second associated service, and associating the second associated service to the first associated service according to the path information of the second associated service; and a node of the second associated service acquiring path information of the first associated service from a node of the first associated service, and associating the first associated service to the second associated service according to the path information of the first associated service.

It can be found through comparison that the solution of the present invention differs from that of the prior art. That is, in the present invention, the node of the first associated service could automatically acquire path information of the second associated service, and exclude the nodes and/or links contained in the transmission path of the second associated service during rerouting, thus guarantee the exclusion of the two paths of the first associated service and the second associated service.

The differences can bring obvious benefits to the present invention. After the association relation between the primary service and the slave service of the 1+1 protection service is established, 1+1 protection could be implemented even if the initial node and/or terminal node of the 1+1 protection service are/is outside the ASON. Particularly, the method of the present invention could provide a better 1+1 protection when the ASON coexists with a non-intelligent optical network.

EMBODIMENTS OF THE INVENTION

A process of implementing 1+1 protection via establishing association relations between services when the initial node and the terminal node are inside the ASON, or the initial node and/or terminal node are/is outside the ASON would be depicted. The process includes establishing, updating, canceling the association relation between the primary service and the slave service of a 1+1 protection service, and further includes managing the association relation when either of the two services is rerouted.

In the following, one of the primary service and slave service of the 1+1 protection service is called a first associated service, while the other is called a second associated service. When the first associated service is rerouted because of failure, a new path, that is a reroute path, is generated to transmit the corresponding service data. For the convenience of description, when the service data is transmitted on the reroute path, it is called a third associated service. The situation of the first associated service sending an association request message for establishing association with the second associated service is called associating the second associated service to the first associated service, which is a unidirectional association initiated actively by the first associated service. Similarly, the second associated service could request to associate with the first associated service, which is called associating the first associated service to the second associated service. When the two unidirectional associations are set up, a bidirectional association relation is established between the first associated service and the second associated service.

Before illustrating an embodiment of the invention, the process of establishing LSPs according to the ordinary 1+1 protection mechanism is introduced. With regard to a 1+1 protection service, paths for transmitting the primary service and the slave service remain exclusive based on LSP IDs generated at the entrance node inside the ASON 1 and identifiers of both the primary service and the slave service. For instance, one of the paths named path A is firstly established, and all the nodes and/or links the path A passes through are recorded. When establishing the other path B, the nodes and/or links passed by the path A would be excluded from a candidate set before determining the nodes and/or links the path B goes through, so as to avoid the two paths using a same node and/or link.

Figure 2:
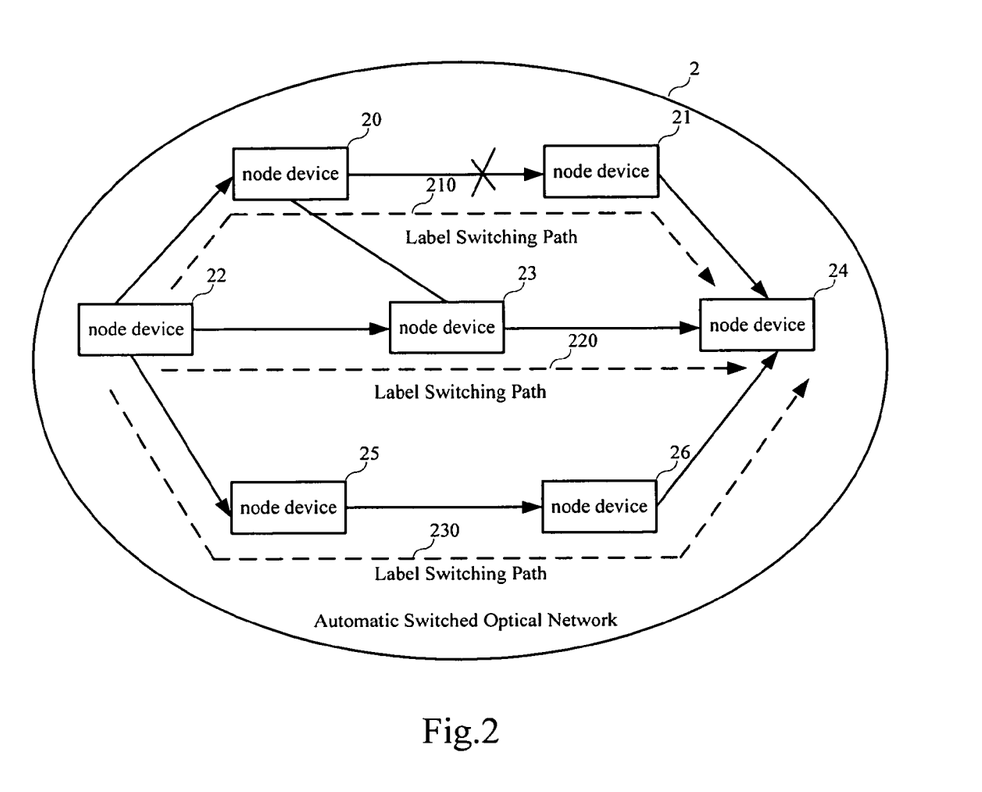
FIG. 2 is a schematic diagram illustrating principles of realizing 1+1 protection through association in an ASON of an embodiment of the present invention.

As shown in FIG. 2, the ASON 2 represents an optical transport network, including node devices from 20 to 26. When the ASON 2 is in a normal state, LSPs 210, 220 and 230 are configured in advance, wherein LSP 210 is set as a protection path and LSP 220 is set as a working path. LSP 230 is a reroute path not used yet, the LSP ID of which is saved in node device 22. When LSP 210 fails, the network would reroute the path by replacing LSP 210 with LSP 230.

The reroute path in the above embodiment is defined in advance, and in another embodiment of the invention, the reroute path could be established dynamically. Taking FIG. 2 as an example, supposing LSPs 210 and 220 are configured in advance (LSP 230 is not preconfigured), wherein LSP 210 is defined as a protection path and LSP 220 is defined as a working path. When LSP 210 goes wrong, the network would execute rerouting. Since there is not an available reroute path set in advance, the network needs to automatically establish a new LSP. Assuming that the automatically established path is also represented as LSP 230, those skilled in the art could know that it is a mature technology to automatically establish a new LSP in a network. After that, LSP 230 would replace the failed LSP 210 to transmit the corresponding service data.

In FIG. 2, when the ASON 2 is in a normal state, LSPs 210 and 220 are the paths responsible for transmitting the first associated service and the second associated service, respectively. When LSP 210 goes wrong, the service data originally transmitted on LSP 210 would switch to LSP 230. Thus, LSP 230 and LSP 220 are the paths for transmitting the third associated service and the second associated service.

Detailed descriptions of the embodiment would be given with reference to the following two practical examples. When the initial node of the 1+1 protection service is outside the ASON, 1+1 protection could be accomplished through establishing the association relation between the first associated service and the second associated service of the 1+1 protection service. The association can merely be a unidirectional association, or it can be a bidirectional association. The embodiment is also applicable to the situation that the initial node of the 1+1 protection service is inside the ASON. The above situation could be considered as a particular case that the initial node of the 1+1 protection service is outside the ASON and accesses the ASON through a common entrance node. In the following, specific instructions would first be given to the situation that the initial node of the 1+1 protection service is inside the ASON.

With references to FIG. 2, FIG. 3, FIG. 4, FIG. 5 and FIG. 6, the establishing, canceling, updating of the association relation between the first associated service and the second associated service of the 1+1 protection service when the initial node of the 1+1 protection service is inside the ASON are illustrated in the following, so is the processing of the association relation in case of rerouting, etc. The process, taking the first associated service initiating the association as an example, includes processing procedures and signaling flow procedures on each node device. First, the establishing of the association relation is described with reference to FIG. 2 and FIG. 3.

Figure 3:
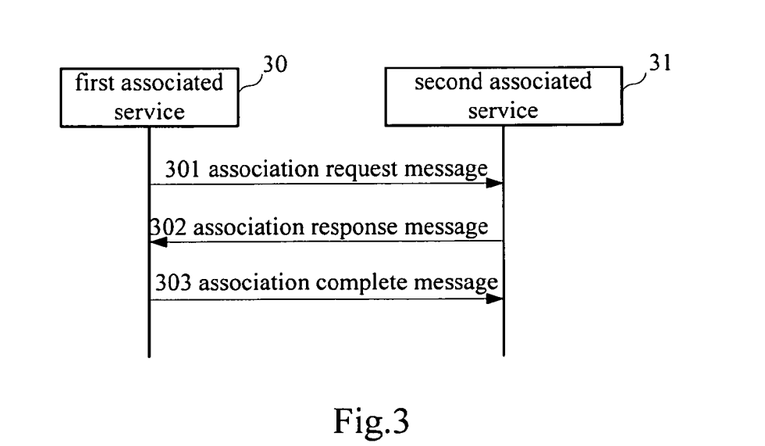
FIG. 3 is a schematic diagram of an embodiment illustrating a signaling flow of establishing association in an ASON.

In FIG. 3, the first associated service 30 represents the service data transmitted on LSP 210 shown in FIG. 2, and the second associated service 31 represents the service data transmitted on LSP 220 in FIG. 2.

Firstly, a node processing procedure. The user allocates LSPs passing through the ASON 2 of FIG. 2 in advance for the first associated service and the second associated service requiring to establish an association. Here, one item of the properties of the first associated service 30 is set as the LSP ID of the second associated service 31, representing that the first associated service 30 needs to associate with the second associated service 31. It should be pointed out that the entrance node of the first associated service 30 is node device 22 in FIG. 2, which generates and saves the LSP ID of the first associated service 30. The entrance node of the second associated service 31 is also node device 22 in FIG. 2, which generates and saves the LSP ID of the second associated service 31 likewise.

Subsequently, a signaling flow procedure at Step 301. The entrance node of the first associated service 30 sends an association request message to the entrance node of the second associated service 31.

Then, another signaling flow procedure at Step 302. The entrance node of the second associated service 31 sends an association response message to the entrance node of the first associated service 30, containing in the message the path information of the second associated service 31.

Then, a node processing procedure. The entrance node of the first associated service 30 acquires the path information of the second associated service 31 from the association response message, and saves the information. The path information of the second associated service 31 refers to the information of LSP 220 in FIG. 2, recording nodes and/or links contained in LSP 220.

Finally, a signaling flow procedure at Step 303. The entrance node of the first associated service 30 sends an association complete message to the entrance node of the second associated service 31, indicating that the second associated service 31 has been associated with the first associated service 30.

It should be noted that the first associated service 30 could send a request through any node of its own, generally the entrance node or exit node of the first associated service 30 in the ASON, to a node of the second associated service 31. The request is, for example, acquiring the LSP information of the second associated service from the entrance node or exit node of the second associated service 31 in the ASON or other nodes containing the LSP information. Ultimately, the LSP information is saved on the node initiating 1+1 protection. The first associated service 30 saves the LSP information of the second associated service 31, and excludes the nodes and/or links of the LSP of the second associated service 31 from a candidate set when the first associated service 30 is rerouted.

The canceling of the association relation is instructed as follows with reference to FIG. 2 and FIG. 4.

Figure 4:
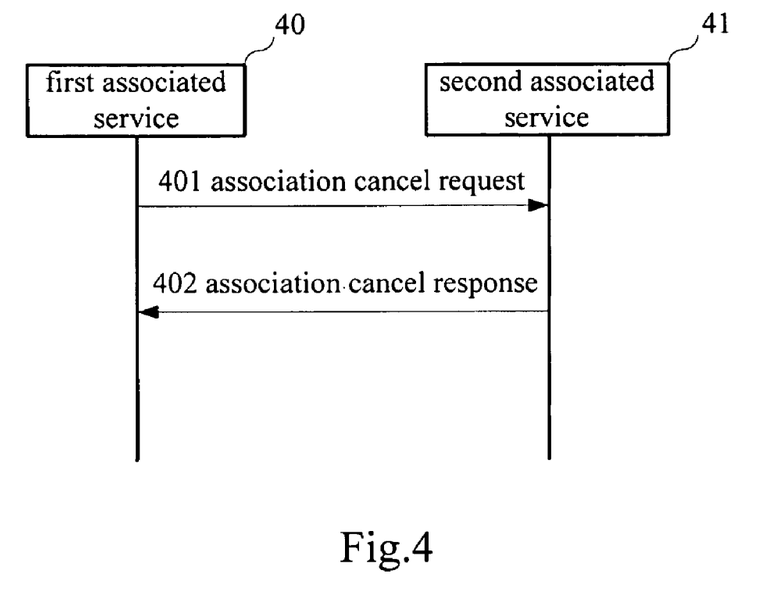
FIG. 4 is a schematic diagram of an embodiment illustrating a signaling flow of canceling association in an ASON.

FIG. 4 illustrates a signaling process of canceling the association of the second associated service 41 with the first associated service 40. In FIG. 4, the first associated service 40 represents the service data transmitted on LSP 210 in FIG. 2, and the second associated service 41 represents the service data transmitted on LSP 220 in FIG. 2. The canceling of the association relation is as follows.

Firstly, a signaling flow procedure at Step 401. The entrance node of the first associated service 40 sends an association cancel request to the entrance node of the second associated service 41.

Subsequently, a node processing procedure. The entrance node of the first associated service 40 deletes the path information of the second associated service 41 saved in itself.

Then, a node processing procedure. After receiving the association cancel request, the entrance node of the second associated service 41 deletes the association record saved in itself, e.g., the LSP ID of the first associated service 40, etc.

Finally, a signaling flow procedure at Step 402. The entrance node of the second associated service 41 sends an association cancel response to the entrance node of the first associated service 40, and accomplishes the canceling.

Figure 5:
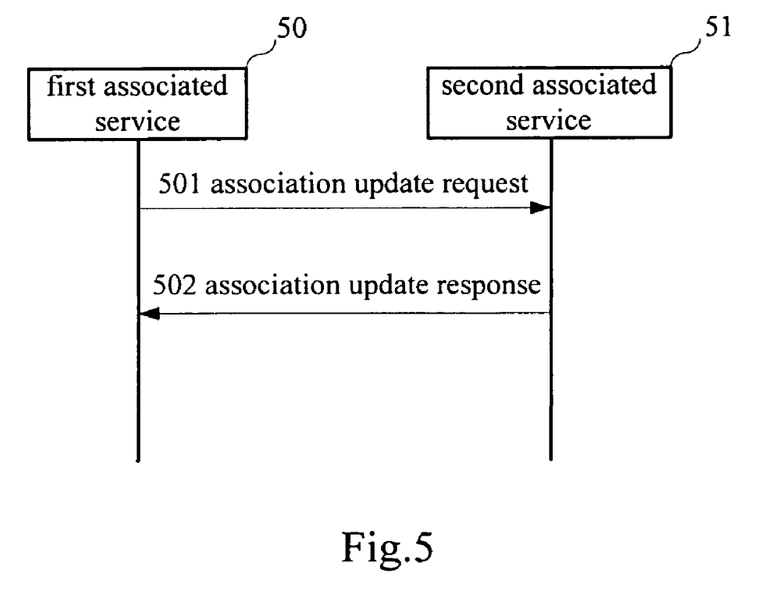
FIG. 5 is a schematic diagram illustrating a signaling flow of updating association in an ASON.

The updating of the association relation is instructed with reference to FIG. 2 and FIG. 5.

FIG. 5 illustrates a signaling process of updating the association relation between the first associated service 50 and the second associated service 51. In FIG. 5, the first associated service 50 represents the service data transmitted on LSP 210 shown in FIG. 2; the second associated service 51 represents the service data transmitted on LSP 230 shown in FIG. 2. Here, LSP 230 is different from that in FIG. 4 indicating that the path of the second associated service has been changed in this embodiment. The updating of the association relation is as follows.

Firstly, a node processing procedure. Because the path of the second associated service 51 has been changed, namely the second associated service will no longer be transmitted through LSP 220, it is necessary to update the association relation.

Subsequently, a signaling flow procedure at Step 501. After the updating, the second associated service 51 sends an association update request through the new entrance node of its own to the entrance node of the first associated service 50, namely node device 40, containing in the request the new path information of the second associated service.

Then, a node processing procedure again. After receiving the association update request, the entrance node of the first associated service 50 accomplishes the updating and saves the new path information of the second associated service 51.

Finally, a signaling flow procedure at Step 502. The entrance node of the first associated service 50, sends an association update response to the entrance node of the second associated service 52, namely node device 43.

The rerouting process is illustrated with reference to FIG. 2 and FIG. 6. The rerouting is necessary when LSP 210 in FIG. 2 fails.

Figure 6:
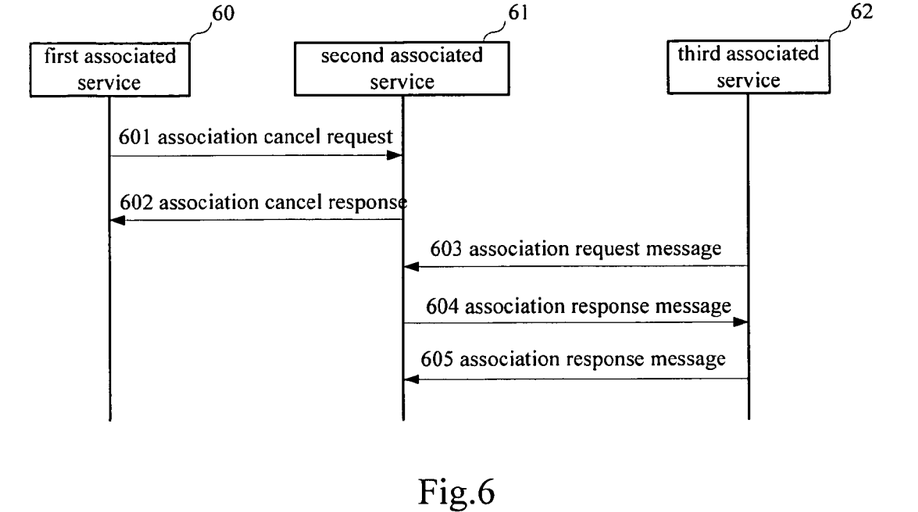
FIG. 6 is a schematic diagram illustrating a signaling flow of establishing association after rerouting in an ASON.

FIG. 6 illustrates signaling processes of canceling the association relation between the first associated service 60 and the second associated service 61, and establishing the association relation between the third associated service 62 and the second associated service 61. In FIG. 6, the first associated service 60 represents the service data transmitted on LSP 210 in FIG. 2, and the second associated service 61 represents the service data transmitted on LSP 220 in FIG. 2. The third associated service 62 generated after rerouting is corresponding to the first associated service 60 and transmitted through LSP 230 in FIG. 2. The rerouting process is described as follows.

Firstly, a signaling flow procedure at Step 601. The entrance node of the first associated service 60 sends an association cancel request to the entrance node of the second associated service 61.

Subsequently, a node processing procedure. The entrance node of the first associated service 60 deletes the path information of the second associated service 61 saved in itself.

Then, a node processing procedure. After receiving the association cancel request, the entrance node of the second associated service 61 deletes the association record saved in itself, e.g., the LSP ID of the first associated service 60, etc.

Then, a signaling flow procedure at Step 602. The entrance node of the second associated service 61 sends an association cancel response to the entrance node of the first associated service 60, canceling the association relation between the first associated service 60 and the second associated service 61.

Then, a signaling flow procedure at Step 603. The entrance node of the third associated service 62, namely node device 22 in FIG. 2, sends an association request message to the entrance node of the second associated service 61.

Then, a signaling flow procedure at Step 604. The entrance node of the second associated service 61 sends an association response message containing the path information of the second associated service 61 to the entrance node of the third associated service 62.

Then, a node processing procedure. The entrance node of the third associated service 62 saves the path information of the second associated service 61 contained in the above association response message, which is the information of LSP 220 in FIG. 2.

Then, a node processing procedure. When determining a reroute path for transmitting the third associated service 62, the nodes and/or links LSP 220 passes through are excluded according to the path information of the second associated service 61.

Then, a node processing procedure again. After rerouting, the third associated service 62 saves the path information of the second associated service 61.

The above association guarantees the exclusion between paths of the third associated service 62 and the second associated service 61. Here, the path transmitting the third associated service 62 is LSP 230 in FIG. 2. Thus, after rerouting, the paths transmitting the 1+1 protection service are LSP 230 and 220.

Finally, a signaling flow procedure at Step 605. The entrance node of the third associated service 62 sends an association response message to the entrance node of the second associated service 61 to confirm the association relation between them.

From the above, a rerouting process caused by a failure of the first associated service 60 includes: a first step, performing the signaling flow procedure of canceling association of the first associated service 60 and the second associated service 61; a second step, performing the signaling flow procedure of establishing association of the third associated service 62 and the second associated service 61.

In the following, illustrations are given according to an embodiment of the invention to realize association when the initial node of the 1+1 protection service is outside the ASON. In other words, the embodiment is applicable not only to the situation that all the nodes are inside the ASON, but also to the situation that some nodes, like the initial node, are outside the ASON. In the latter situation, two LSPs in the ASON may be set up to respectively transmit the first associated service and the second associated service, and through establishing the association relation between the first associated service and the second associated service, the exclusion of the two LSPs could be guaranteed, and 1+1 protection could be realized in broad sense.

With reference to the applications of the embodiment in the cases of FIG. 7, FIG. 8, FIG. 9, FIG. 10 and FIG. 11, the establishing, canceling, updating of association and the processing of rerouting, etc. in the invention are described.

Figure 7:
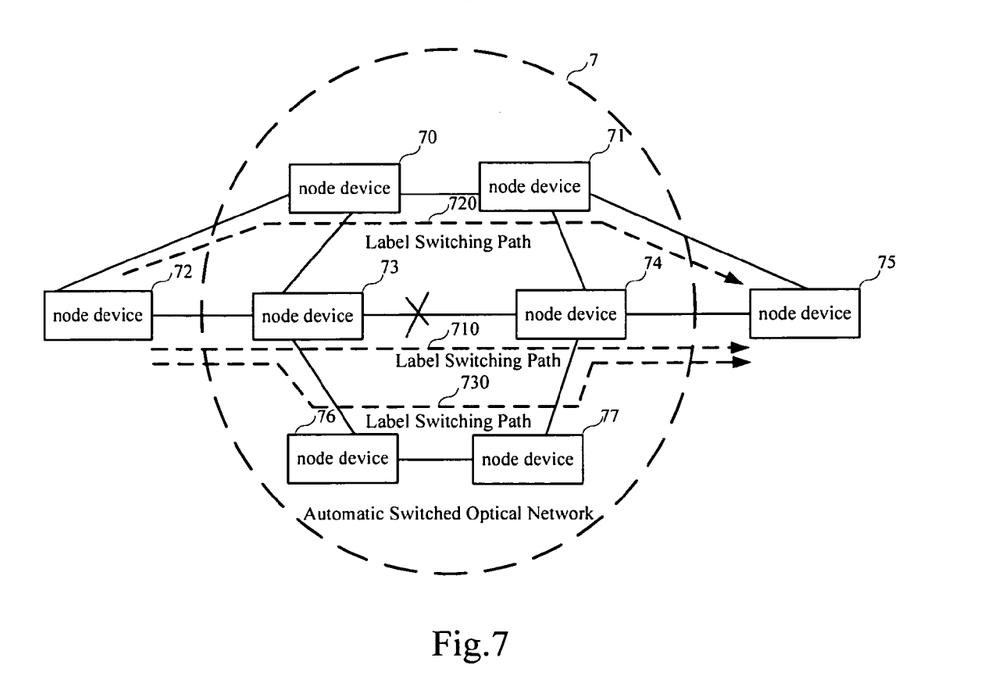
FIG. 7 is a schematic diagram of an embodiment of the present invention for implementing 1+1 protection through association when there are nodes outside the ASON.

As shown in FIG. 7, node device 70, node device 71, node device 73, node device 74, node device 76 and node device 77 are nodes inside the ASON 7, while node devices 72 and 75 do not belong to the ASON 7, i.e., the two node devices are outside the ASON. Assuming a certain 1+1 protection service passing through the ASON 7 with node device 72 as its initial node and node device 75 as its terminal node, it is necessary to establish two LSPs without intersection inside the ASON 7 for primary/standby protection. Comparing with FIG. 2, since the two LSPs have no common entrance node and/or exit node in the ASON 7, it would be difficult to guarantee the exclusion of the two LSPs according to the ordinary 1+1 protection mechanism. If the first associated service and the second associated service transmitted by the two LSPs are associated, when either of the two services is rerouted, the reroute path generated would not intersect with the path of the service not rerouted. As far as node device 72 outside the ASON 7 is concerned, since no related ASON protocol is running, it neither cares nor knows the situation of the paths established inside the ASON 7. What it needs to do is transmitting the same service data over the two paths of the ASON 7 linking to itself according to the ordinary 1+1 protection mechanism. Likewise, as to node device 75, what it needs to do is receiving and comparing the service data transmitted over the two paths of the ASON 7 linking to itself according to the ordinary 1+1 protection mechanism.

The establishing of the association relation in this embodiment will be described with reference to FIG. 7 and FIG. 8.

Figure 8:
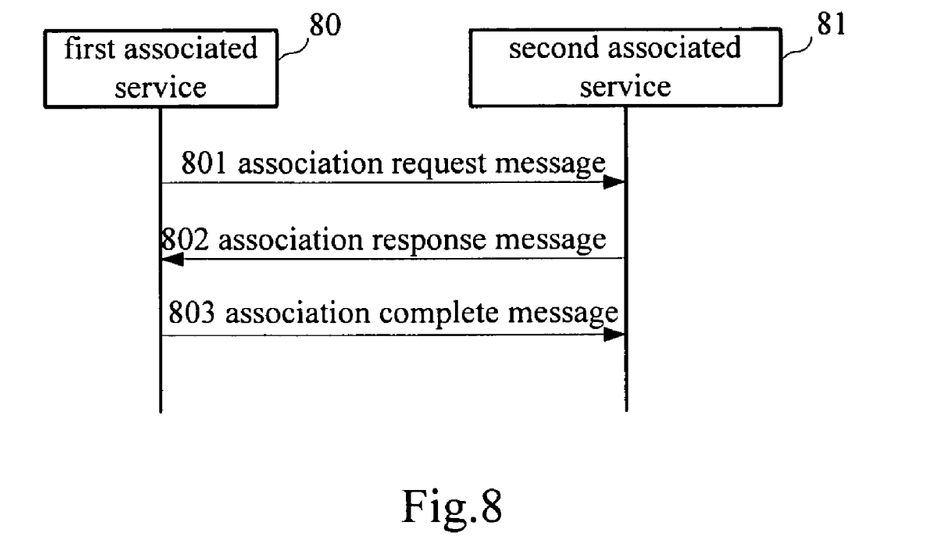
FIG. 8 is a schematic diagram of an embodiment of the present invention illustrating a signaling flow of establishing association for nodes inside the ASON.

In FIG. 8, the first associated service 80 represents the service data transmitted on LSP 710 in FIG. 7, and the second associated service 81 represents the service data transmitted on LSP 720 in FIG. 7.

Firstly, a node processing procedure. The user configures in advance LSPs passing through the ASON 7 shown in FIG. 7 for a pair of services requiring to establish an association, that is the first associated service and the second associated service. When configuring the properties of the first associated service 80, an item would be set as the LSP ID of the second associated service 81, indicating that the first associated service 80 requires to associate with the second associated service 81. It should be pointed out that, the entrance node of the first associated service 80 is node device 73 in FIG. 7, which generates and saves the LSP ID of the first associated service 80. The entrance node of the second associated service 81 is node device 70 in FIG. 7, which generates and saves the LSP ID of the second associated service 81.

Subsequently, a signaling flow procedure at Step 801. The entrance node of the first associated service 80 sends an association request message to the entrance node of the second associated service 81.

Then, a signaling flow procedure at Step 802. The entrance node of the second associated service 81 sends an association response message to the entrance node of the first associated service 80, containing in the message the path information of the second associated service 81.

Then, a node processing procedure. The entrance node of the first associated service 80 acquires the path information of the second associated service 81 from the association response message. Here, the path information is the information of LSP 720 in FIG. 7.

Finally, a signaling flow procedure at Step 803. The entrance node of the first associated service 80 sends an association complete message to the entrance node of the second associated service 81, indicating the second associated service 81 being associated with the first associated service 80.

It should be noted that the first associated service 80 could send a request through any node of its own, generally the entrance node or exit node of the ASON, to a node of the second associated service 81, acquiring the LSP information of the second associated service from the entrance node or exit node of the second associated service 81 in the ASON or from other nodes saving the LSP information of the second associated service 81. Ultimately, this LSP information would be saved on the node device initiating 1+1 protection. The first associated service 80 saves the LSP information of the second associated service 81, and excludes the nodes and/or links contained in the LSP of the second associated service 81 from a candidate set when the first associated service 80 is rerouted.

Figure 9:
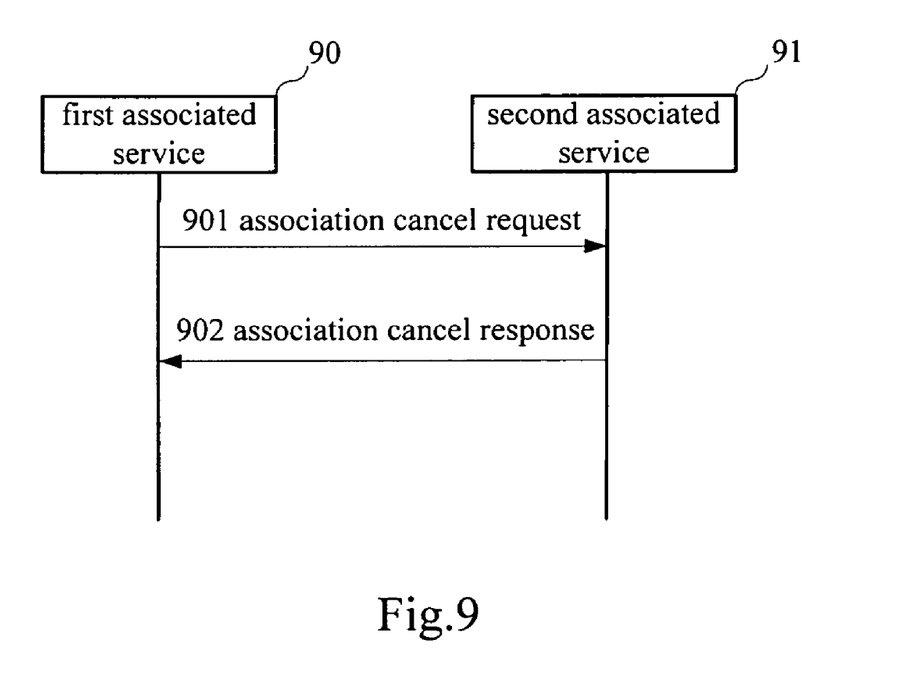
FIG. 9 is a schematic diagram of an embodiment of the present invention illustrating a signaling flow of canceling association for nodes inside the ASON.

The canceling of the association relation would be instructed with reference to FIG. 7 and FIG. 9.

FIG. 9 illustrates a signaling process of canceling the association of the second associated service 91 with the first associated service 90. In FIG. 9, the first associated service 90 represents the service data transmitted on LSP 710 in FIG. 7, and the second associated service 91 represents the service data transmitted on LSP 720 in FIG. 7. The canceling of the association relation is as follows.

Firstly, a signaling flow procedure at Step 901. The entrance node of the first associated service 90, namely node device 73, sends an association cancel request to the entrance node of the second associated service 91, namely node device 70.

Subsequently, a node processing procedure. The entrance node of the first associated service 90 deletes the path information of the second associated service 91 saved in itself.

Then, a node processing procedure. After receiving the association cancel request, the entrance node of the second associated service 91 deletes the association record saved in itself, e.g., the LSP ID of the first associated service 90, etc.

Finally, a signaling flow procedure at Step 902. The entrance node of the second associated service 91 sends an association cancel response to the entrance node of the first associated service 90, accomplishing the canceling of association.

The updating of the association relation would be described with reference to FIG. 7 and FIG. 10.

Figure 10:
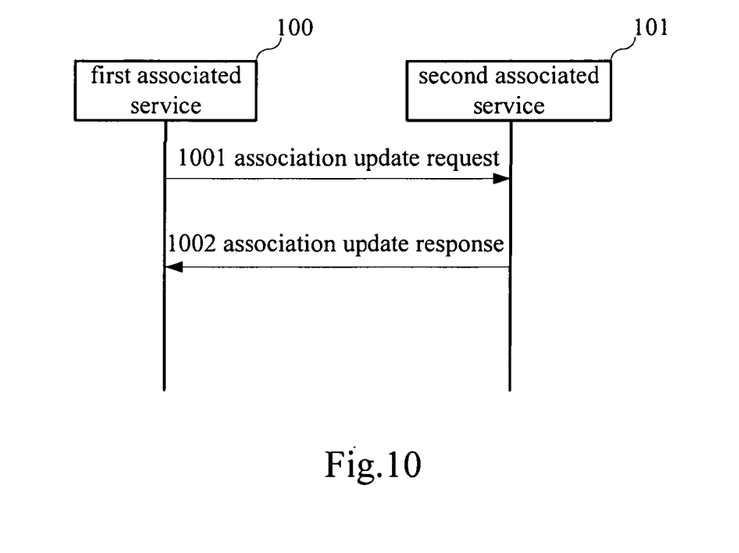
FIG. 10 is a schematic diagram of an embodiment of the present invention illustrating a signaling flow of updating association for nodes inside the ASON.

FIG. 10 illustrates a signaling process of updating the association relation between the first associated service 100 and the second associated service 101. In FIG. 10, the first associated service 100 represents the service data transmitted on LSP 710 in FIG. 7, and the path of the second associated service switches from the old path to LSP 720 in FIG. 7, which is different from FIG. 9. The updating of the association relation is as follows.

Firstly, a node processing procedure. The path of the second associated service 101 switches from the old path to LSP 720, leading to the updating of association.

Then, a signaling flow procedure at Step 1001. The new entrance node of the second associated service 101, namely node device 70, sends an association update request to the entrance node of the first associated service 100, namely node device 73, containing in the request the new path information of the second associated service 101.

Then, a node processing procedure. After receiving the association update request, the entrance node of the first associated service 100 completes the updating, and saves the new path information of the second associated service 101.

Finally, a signaling flow procedure at Step 1002. The entrance node of the first associated service 100 sends an association update response to the entrance node of the second associated service 101.

In the following, a rerouting process is instructed with reference to FIG. 7 and FIG. 11. When LSP 710 in FIG. 7 goes wrong, it is necessary to execute rerouting.

Figure 11:
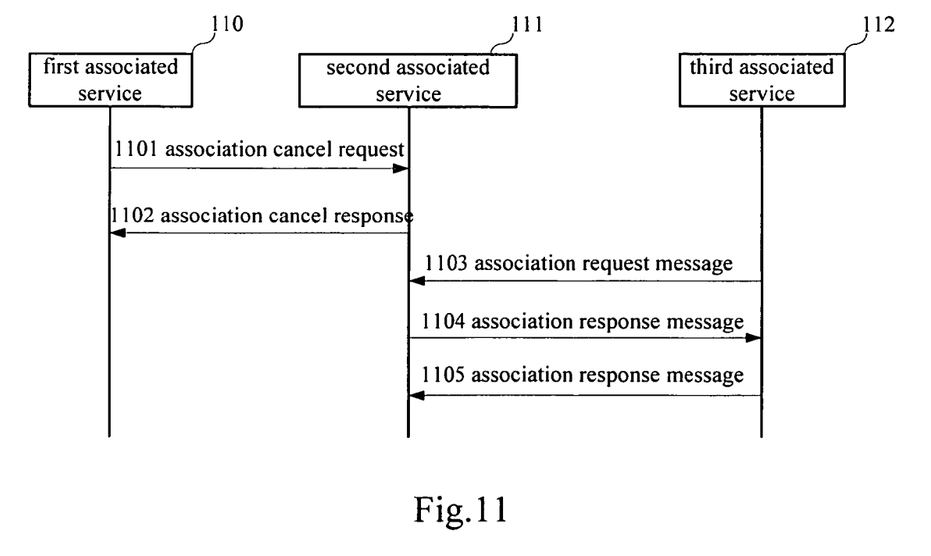
FIG. 11 is a schematic diagram of an embodiment of the present invention illustrating a signaling flow of executing rerouting for nodes inside the ASON.

FIG. 11 illustrates signaling processes of canceling the association relation between the first associated service 110 and the second associated service 111, and establishing the association relation between the third associated service 112 and the second associated service 111. In FIG. 1, the first associated service 110 represents the service data transmitted on LSP 710 in FIG. 7, and the second associated service 111 represents the service data transmitted on LSP 720 in FIG. 7. The third associated service 112 generated after rerouting is corresponding to the first associated service 60, which is transmitted through LSP 730 formed by node device 72, node device 73, node device 76, node device 77, node device 74 and node device 75, and the links between them in FIG. 7. The processing of rerouting is described as follows.

Firstly, a signaling flow procedure at Step 1101. The entrance node of the first associated service 110 sends an association cancel request to the entrance node of the second associated service 111.

Then, a node processing procedure. The entrance node of the first associated service 110 deletes the path information of the second associated service 111 saved in itself.

Then, a node processing procedure. After receiving the association cancel request, the entrance node of the second associated service 111 deletes the association record saved in itself, e.g., the LSP ID of the first associated service 110 etc.

Then, a signaling flow procedure at Step 1102. The entrance node of the second associated service 111 sends an association cancel response to the entrance node of the first associated service 110, canceling the association between the first associated service 110 and the second associated service 111.

Then, a signaling flow procedure at Step 1103. The entrance node of the third associated service 112, namely node device 73 in FIG. 7, sends an association request message to the entrance node of the second associated service 111, namely node device 70 in FIG. 7.

Then, a signaling flow procedure at Step 1104. The entrance node of the second associated service 111 sends an association response message to the entrance node of the third associated service 112, containing in the message the path information of the second associated service 111.

Then, a node processing procedure. The entrance node of the third associated service 112 saves the path information of the second associated service 111 contained in the association response message. Here, the path information is the information of LSP 720 in FIG. 7.

Then, a node processing procedure. When determining a reroute path for transmitting the third associated service 112, the nodes and/or links LSP 720 passes through are excluded according to the path information of the second associated service 111.

Then, a node processing procedure. After rerouting, the third associated service 112 saves the path information of the second associated service 111.

The above association guarantees the exclusion of the two paths of the third associated service 112 and the second associated service 111. Here, the path transmitting the third associated service 112 is LSP 730 in FIG. 7. Thus, after rerouting, the paths transmitting the 1+1 protection service are LSP 730 and 720.

Finally, a signaling flow procedure at Step 1105. The entrance node of the third associated service 112 sends an association response message to the entrance node of the second associated service 111 to confirm the association relation of them two.

As can be seen from the above, the rerouting process caused by the failure of the first associated service 110 includes: first step, a signaling flow procedure of canceling association between the first associated service 110 and the second associated service 111; second step, a signaling flow procedure of establishing association between the third associated service 112 and the second associated service 111.

As shown in the embodiments of the present invention, the essence of the present invention is: the establishing, updating, canceling of association and the processing of rerouting. The method of the invention could automatically realize 1+1 protection, that is, guarantee the exclusion of the two LSPs, through associating the services whether the initial node and/or terminal node of the 1+1 protection service are/is inside or outside the ASON, or there are any changes on the paths transmitting the primary service and the slave service. Of course, those skilled in the art should know that using association to realize 1+1 protection is just a particular case in the applications of association. The method is also applicable when the two services establishing the association relation are different, e.g., the method could be used in establishing a VPN in optical channel level, or performing flow control in an ASON etc. In other words, the embodiment could be utilized not only in 1+1 protection mechanism, but also in other aspects of the ASON.

Apparently, those skilled in the art should know that the ASON in the embodiments of the present invention could be a Synchronous Digital Hierarchy (SDH), or a Synchronous Optical Network (SONET), or a wavelength switch network.

Having described in detail preferred embodiments of the current invention, it will now be apparent to those skilled in the art that numerous modifications can be made without departing from and therefore should be protected by the scope of the invention as defined in the appending claims and its equivalents.

We claim:

1. A method of implementing association in an Automatic Switched Optical Network (ASON), the method comprising:

sending, by a node of a first associated service, an association request message to a node of a second associated service, wherein the node of the first associated service and the node of the second associated service are inside the ASON, the first associated service and the second associated service are a pair of services transmitted on two paths according to 1+1 protection mechanism, the first associated service and the second associated service have a common initial node and a common terminal node which are outside of the ASON and have no common node inside the ASON;

acquiring, by the node of the first associated service, path information of the second associated service via an association response message from the node of the second associated service, and associating the second associated service to the first associated service according to the path information of the second associated service;

when the first associated service is rerouted to generate a corresponding third associated service, the method further comprises:

the node of the first associated service deleting the path information of the second associated service saved in itself, and canceling the association relation between the first associated service and the second associated service; and a node of the third associated service acquiring the path information of the second associated service from the node of the second associated service, and when determining a path for transmitting the third associated service, excluding the nodes and/or links recorded in the path information of the second associated service from the path for transmitting the third associated service.

2. The method according to claim 1, wherein the process of acquiring path information of the second associated service comprises:

the node of the first associated service sending an association request message to the node of the second associated service, and the node of the second associated service providing via the association response message the path information of the second associated service to the node of the first associated service;

the process of associating the second associated service to the first associated service comprising: the node of the first associated service saving the path information of the second associated service, and feeding back an association complete message to the node of the second associated service.

3. The method according to claim 1, when the first associated service is rerouted to generate a corresponding third associated service, the method further comprises:

a node of the third associated service acquiring the path information of the second associated service from a node of the first associated service, and when determining a path for transmitting the third associated service, excluding the nodes and/or links recorded in the path information of the second associated service from the path for transmitting the third associated service.

4. The method according to claim 1, when the first associated service is rerouted, the method comprising:

the node of the first associated service deleting the path information of the second associated service saved in itself, and sending an association cancel request to the node of the second associated service, informing the node of the second associated service to cancel the association of them;

the node of the second associated service responding to the association cancel request, deleting the corresponding association record saved in itself, and feeding back an association cancel response to the node of the first associated service;

the node of the third associated service sending an association request message to the node of the second associated service, and via an association response request, the node of the second associated service providing the path information of the second associated service to the node of the third associated service;

the node of the third associated service saving the path information of the second associated service, when determining a path for transmitting the third associated service, excluding the nodes and/or links recorded in the path information of the second associated service from the path for transmitting the third associated service, and feeding back an association complete message to the node of the second associated service.

5. The method according to claim 1, when the path of the second associated service changes, the method further comprising:

the node of the first associated service updating the path information of the second associated service saved in itself.

6. The method according to claim 5, wherein the process of updating comprising:

via an association update request, the node of the second associated service providing the updated path information of the second associated service to the node of the first associated service, and the node of the first associated service feeding back an association update response to the node of the second associated service after accomplishing the updating.

7. The method according to claim 1, further comprising: a node of the first associated service initiating an association cancel process, and canceling the association relation with the second associated service.

8. The method according to claim 7, wherein the process of canceling the association relation comprising:

via an association cancel request, the node of the first associated service informing the node of the second associated service to cancel the association of them, and deleting the path information of the second associated service saved in itself;

the node of the second associated service responding to the association cancel request, deleting the corresponding association record saved in itself, and feeding back an association cancel response to the node of the first associated service.

9. The method according to claim 1, wherein the node of the first associated service is an entrance node or exit node of the first associated service in the ASON;

the node of the second associated service is an entrance node or exit node of the second associated service in the ASON.

10. The method according to claim 1, wherein the node of the first associated service is any node saving the path information of the first associated service other than an entrance node or exit node of the first associated service;

the node of the second associated service is any node saving the path information of the second associated service other than an entrance node or exit node of the second associated service.

11. The method according to claim 1, wherein the ASON is a Synchronous Digital Hierarchy (SDH), or a Synchronous Optical Network (SONET), or a Wavelength Switch Network.

12. A method of implementing association in an Automatic Switched Optical Network (ASON), the method comprising:
setting a first associated service and a second associated service as a primary service and slave service of a 1+1 protection service;
    sending, by a node of the first associated service, a first association request message to a node of the second associated service, wherein the node of the first associated service and the node of the second associated service are inside the ASON, the first associated service and the second associated service have a common initial node and a common terminal node which are outside of the ASON and have no common node inside the ASON; acquiring, by the node of the first associated service, path information of the second associated service via a first association response message from the node of the second associated service, and associating the second associated service to the first associated service according to the path information of the second associated service; and
    sending, by the node of the second associated service, a second association request message to the node of the first associated service, acquiring, by the node of the second associated service, path information of the first associated service via a second association response message from the node of the first associated service, and associating the first associated service to the second associated service according to the path information of the first associated service;
    wherein when the first associated service is rerouted to generate a corresponding third associated service, the method further comprises:
    the node of the first associated service deleting the path information of the second associated service saved in itself, and canceling the association relation between the first associated service and the second associated service; and
    a node of the third associated service acquiring the path information of the second associated service from the node of the second associated service, and when determining a path for transmitting the third associated service, excluding the nodes and/or links recorded in the path information of the second associated service from the path for transmitting the third associated service.

13. The method according to claim 12, wherein when the first associated service is rerouted, the method comprising:
    the node of the first associated service deleting the path information of the second associated service saved in itself, and sending an association cancel request to the node of the second associated service, informing the node of the second associated service to cancel the association of them;
    the node of the second associated service responding to the association cancel request, deleting the corresponding association record saved in itself, and feeding back an association cancel response to the node of the first associated service;
    the node of the third associated service sending an association request message to the node of the second associated service, and via an association response request, the node of the second associated service providing the path information of the second associated service to the node of the third associated service;
    the node of the third associated service saving the path information of the second associated service, when determining a path for transmitting the third associated service, excluding the nodes and/or links recorded in the path information of the second associated service from the path for transmitting the third associated service, and feeding back an association complete message to the node of the second associated service.

* * * * *